United States Patent Office 3,206,447
Patented Sept. 14, 1965

3,206,447
PRODUCTION OF CIS-1,4-POLYBUTADIENE WITH A TITANIUM HALIDE–MgR$_2$–I$_2$ CATALYST
Robert P. Zelinski, Bartlesville, Okla., assignor to Phillips Petroleum Company, a corporation of Delaware
No Drawing. Filed Mar. 13, 1961, Ser. No. 95,034
3 Claims. (Cl. 260—94.3)

This invention relates to a process for polymerizing 1,3-butadiene so as to obtain a rubbery polymer. In one aspect, the invention relates to a process for producing cis-1,4-polybutadiene and a novel catalyst system therefor.

In recent years there has been a great deal of activity in the development of processes for producing olefin polymers. Polymers of monoolefins, such as ethylene and propylene, prepared by these processes have received wide acceptance by many industries. The more recent discovery in the field of diene polymerization of certain so-called stereospecific catalysts, which make possible the formation of polymers having a desired configuration, has aroused considerable interest. The polymers formed by the use of these catalysts often have outstanding physical properties which render them equal to or even superior to natural rubber. The present invention is concerned with a novel and improved process for preparing a polybutadiene containing a high percentage of cis-1,4-addition.

It is an object of this invention to provide a novel process for producing a rubbery polymer of 1,3-butadiene. Another object of the invention is to provide a process for polymerizing 1,3-butadiene in which the rubbery polymer produced contains a high percentage, e.g., from 90 to 95 percent and higher, of cis-1,4-addition.

A further object of the invention is to provide a novel catalyst system for use in the preparation of a polybutadiene of high cis-1,4-content.

Other and further objects and advantages of the invention will become apparent to those skilled in the art upon consideration of the accompanying disclosure.

Broadly speaking, the process of this invention comprises the step of contacting 1,3-butadiene with a catalyst which forms on mixing components comprising (a) an organomagnesium compound having the formula R$_2$Mg, wherein R is a hydrocarbon radical selected from the group consisting of alkyl, cycloalkyl, aryl, alkaryl and aralkyl radicals, and (b) a compound having the formula TiX$_m$, wherein X is chlorine or bromine and $m$ is an integer from 2 to 4, inclusive, and iodine. The R radical in the aforementioned formula preferably contains up to and including 20 carbon atoms. It has been found that when the above-described catalyst is used in the polymerization of 1,3-butadiene, a polybutadiene is produced which contains from 90 to 95 percent and higher, cis-1,4-addition.

Examples of organomagnesium compounds suitable for use in the present catalyst system include dimethylmagnesium, diethylmagnesium, di-n-propylmagnesium, di-tert-butylmagnesium, di-n-hexylmagnesium, didecylmagnesium, di(tridecyl)-magnesium, dieicosylmagnesium, dicyclohexylmagnesium, di-4-methylcyclohexylmagnesium, dibenzylmagnesium, di(4-phenyl-n-butyl)magnesium, diphenylmagnesium, di-1-naphthylmagnesium, di-4-tolylmagnesium, di(2,4-diethylphenyl)magnesium, di(3,5-di-n-heptylphenyl)magnesium, methylethylmagnesium, methylphenylmagnesium, butylbenzylmagnesium, and the like.

The second component of the present catalyst system can also be defined as being a mixture of a titanium halide having the formula TiX$_m$, wherein X is chlorine or bromine, and $m$ is an integer from 2 to 4, inclusive, and iodine. It is often preferred to mix the titanium halide and iodine prior to their use in the system. It is usually preferred to use titanium tetrachloride in conjunction with the iodine.

Examples of specific catalyst systems which can be employed in the practice of this invention include the following: diphenylmagnesium, titanium tetrachloride and iodine; dimethylmagnesium, titanium tetrachloride and iodine; diphenylmagnesium, titanium tetrabromide and iodine; and di-1-naphthylmagnesium, titanium tetrachloride and iodine.

The mol ratio of the organomagnesium compound to total titanium in the catalyst system is usually in the range of 0.75:1 to 3:1. The mol ratio of titanium halide to iodine is in the range of 0.5:1 to 1.25:1. The concentration of total catalyst used in the present process can vary over a rather wide range. The catalyst level is generally in the range of 1 to 20 gram millimols of the organomagnesium compound per 100 grams of 1,3-butadiene to be polymerized. The actual catalyst level used is, in general, determined by the molecular weight of the product which is desired.

The polymerization process of this invention is usually carried out in the presence of a diluent. Diluents suitable for use in the process are hydrocarbons which are non-detrimental to the polymerization reaction. Suitable diluents include aromatics, such as benzene, toluene, xylene, ethylbenzene, and mixtures thereof. It is also within the scope of the invention to use straight and branched chain paraffins which contain up to and including 12 carbon atoms per molecule. Examples of suitable paraffins include propane, normal butane, normal pentane, isopentane, normal hexane, isohexane, 2,2,4-triethylpentane (isooctane), normal decane, normal dodecane, and the like. Mixtures of these paraffinic hydrocarbons can also be employed as diluents in carrying out the process. Cycloparaffins, such as cyclohexane and methylcyclohexane, can also be used as diluents. It is usually preferred to carry out the polymerization in the presence of an aromatic hydrocarbon since polymers having a higher cis-content are produced when operating with this diluent.

The polymerization process of this invention can be carried out at temperatures varying over a rather wide range, e.g., from −100 to 250° F. It is usually preferred to operate at a temperature in the range of −30 to 160° F. The polymerization reaction can be carried out under autogenous pressure or at any suitable pressure sufficient to maintain the reaction mixture substantially in the liquid phase. The pressure will thus depend upon the particular diluent being employed and the temperature at which the polymerization is conducted. However, higher pressures can be utilized if desired, these pressures being obtained by some such suitable method as the pressurization of the reactor with a gas which is inert with respect to the polymerization reaction. It is to be understood also that it is within the scope of the invention to conduct the polymerization in the solid phase.

The process of this invention can be carried out as a batch process by charging 1,3-butadiene to a reactor containing catalyst and diluent. Although any suitable charging procedure can be used, it is often preferred to add the catalyst components to a reactor containing diluent and thereafter introducing the 1,3-butadiene. In the case of the mixture of a titanium halide and iodine, the individual components can be added to the reactor separately or they can be mixed with each other or with the organometal compound prior to introduction into the reactor. It is to be understood that it is within the scope of the invention to preform the catalyst by reacting the catalyst components within a separate catalyst preparation vessel. The resulting reaction product can then be charged to the reactor containing monomer and diluent, or these latter materials can be added after the catalyst. The process can also be carried out continuously by maintaining the above-mentioned concentrations of reactants in the reactor for a suitable residence time. The residence time in a continuous process will, of course, vary within rather wide limits, depending upon such variables as temperature, pressure, the ratio of catalyst components and the catalyst concentration. In a continuous process, the residence time usually falls within the range of 1 second to 2 hours when conditions within the specified ranges are employed. When a batch process is being utilized, the time for the reaction can be as high as 24 hours or more.

Various materials are known to be detrimental to the catalyst composition of this invention. These materials include carbon dioxide, oxygen and water. It is usually desirable, therefore, that the butadiene be freed of these materials as well as other materials which may tend to inactivate the catalyst. Any of the known means for removing such contaminants can be used. Furthermore, when a diluent is utilized in the process, it is preferred that this material be substantially free of impurities such as water, oxygen and the like. In this connection it is desirable to remove air and moisture from the reaction vessel in which the polymerization is to be conducted. Although it is preferred to carry out the polymerization under anhydrous or substantially anhydrous conditions, it is to be understood that some small amounts of these catalyst-inactivating materials can be tolerated in the reaction mixture. However, it is also to be understood that the amount of such materials which can be tolerated is insufficient to cause complete deactivation of the catalyst.

Upon completion of the polymerization reaction, when a batch process is used, the total reaction mixture is then treated to inactivate the catalyst and recover the rubbery product. Any suitable method can be employed in carrying out this treatment of the reaction mixture. In one method, the polymer is recovered by steam stripping the diluent from the polymer. In another suitable method, a catalyst-inactivating material, such as an alcohol, is added to the mixture so as to inactivate the catalyst and cause precipitation of the polymer. The polymer is then separated from the alcohol and diluent by any suitable method, such as decantation or filtration. It is often preferred to add initially only an amount of the catalyst-inactivating material which is sufficient to inactivate the catalyst without causing precipitation of the polymer. It has also been found to be advantageous to add an antioxidant, such as phenyl-beta-naphthylamine, to the polymer solution prior to recovery of the polymer. After addition of the catalyst-inactivating material and the antioxidant, the polymer present in the solution can then be separated by the addition of an excess of a material such as ethyl alcohol or isoproply alcohol. When the process is carried out continuously, the total effluent from the reactor can be pumped to a catalyst-inactivating zone wherein the reactor effluent is contacted with a suitable catalyst-inactivating material such as an alcohol. When an alcohol is used as the catalyst-inactivating material, it also functions to precipitate the polymer. In the event the catalyst-inactivating materials which are employed do not perform this dual function, a suitable material, such as an alcohol, can be added to precipitate the polymer. It is, of course, to be realized that it is within the scope of the invention to employ other suitable means to recover the polymer from solution. After separation from the water or alcohol and diluent by filtration or other suitable means, the polymer is then dried.

The polymers produced in accordance with this invention are rubbery polymers. The polymers can be compounded by the various methods such as have been used in the past for compounding natural and synthetic rubbers. Vulcanization accelerators, vulcanizing agents, reinforcing agents, and fillers such as have been employed in natural rubbers can likewise be used in compounding the rubbers of this invention. It is also within the scope of the invention to blend the polymers with other polymeric materials such as natural rubber, cis-1,4-polyisoprene, polyethylene, and the like. As mentioned hereinbefore, the polymers of this invention have a very high cis-content, and this property renders them very suitable for applications requiring low hysteresis, high resiliency and low freeze point. In general, the polymers have utility in applications where natural and synthetic rubbers are used. They are particularly useful in the manufacture of automobile and truck tires and other rubbery articles, such as gaskets.

A more comprehensive understanding of the invention can be obtained by referring to the following illustrative examples which are not intended, however, to be unduly limitative of the invention.

A sample of one of the polymer products produced in the runs described in the example was examined by infrared analysis. This work was carried out in order to determine the percentage of the polymer formed by cis-1,4-addition, trans-1,4-addition, and 1,2-addition of the butadiene. The procedure described hereinafter was employed in making these determinations shown in the other examples.

Polymer samples were dissolved in carbon disulfide to form a solution having 25 grams of polymer per liter of solution. The infrared spectrum of each of the solutions (percent transmission) was then determined in a commerical infrared spectrometer.

The percent of the total unsaturation present as trans-1,4- was calculated according to the following equation and consistent units:

$$\epsilon = \frac{E}{tc}$$

where $\epsilon$ equals extinction coefficient (liters-mols$^{-1}$-centimeters$^{-1}$); E equals extinction (log $I_0/I$); $t$ equals path length (centimeters); and $c$ equals concentration (mols double bond/liters). The extinction was determined at the 10.35 micron band and the extinction coefficient was 146 (liters-mols$^{-1}$-centimeters$^{-1}$).

The percent of the total unsaturation present as 1,2- (or vinyl) was calculated according to the above equation, using the 11.0 micron band and an extinction coefficient of 209 (liters-mols$^{-1}$-centimeters$^{-1}$).

The percent of the total unsaturation present as cis-1,4- was obtained by subtracting the trans-1,4- and 1,2- (vinyl) determined according to the above procedures, from the theoretical unsaturation, assuming one double bond per each $C_4$ unit in the polymer.

EXAMPLE

Diphenylmagnesium, titanium tetrachloride, and iodine were employed as the catalyst system for the polymerization of butadiene. The following recipe was used in the runs:

*Recipe*

| | |
|---|---|
| 1,3-butadiene, parts by weight | 100 |
| Toluene, parts by weight | 1200 |
| Diphenylmagnesium, millimoles ($\phi_2$mg.) | 2.5 |
| Titanium tetrachloride, millimoles | Variable |
| Iodine, millimoles | Variable |
| Temperature, °F. | 41 |
| Time, hours | 21 |

Toluene was charged first and the reactor was then purged with nitrogen. Toluene solutions of diphenylmagnesium and iodine were charged in that order, followed by the butadiene and finally by the titanium tetrachloride. The charging was done at room temperature, and the mixture was cooled immediately to the polymerization temperature. The amounts of materials employed and results obtained are shown below in table:

Table

| Run No. | Φ₂Mg, Mmoles | TiCl₄, Mmoles | I₂, Mmoles | Mg/Ti Mole Ratio | TiCl₄/I₂ Mole Ratio | Conv., percent | Microstructure, percent | | |
|---|---|---|---|---|---|---|---|---|---|
| | | | | | | | Cis | Trans | Vinyl |
| 1 | 2.5 | 1.67 | 1.67 | 1.5/1 | 1/1 | 70 | | | |
| 2 | 2.5 | 1.67 | 2.08 | 1.5/1 | 0.8/1 | 30 | | | |
| 3 | 2.5 | 1.25 | 1.25 | 2/1 | 1/1 | 100 | | | |
| 4 | 2.5 | 1.25 | 1.87 | 2/1 | 0.7/1 | 60 | | | |
| 5 | 2.5 | 1.0 | 1.0 | 2.5/1 | 1/1 | 32 | | | |
| 6 | 2.5 | 1.0 | 1.75 | 2.5/1 | 0.6/1 | 100 | 95.4 | 1.4 | 3.2 |

The data in the foregoing tables demonstrate that the catalyst of this invention is effective in polymerizing 1,3-butadiene to a polybutadiene containing a high percentage of cis-1,4-addition. It is noted also that high conversions were obtained with the present catalyst system.

As will be evident to those skilled in the art, many variations and modifications of this invention can be practiced in view of the foregoing disclosure. Such variations and modifications are believed to come within the spirit and scope of the invention.

I claim:

1. A process for preparing a cis-1,4-polybutadiene which comprises contacting 1,3-butadiene in a hydrocarbon diluent with a catalyst which forms on mixing components comprising (a) an organomagnesium compound having the formula $R_2Mg$, wherein R is selected from the group consisting of alkyl, cycloalkyl, aryl, alkaryl and aralkyl radicals, (b) a compound having the formula $TiX_m$, wherein X is selected from the group consisting of chlorine and bromine and $m$ is an integer from 2 to 4, inclusive, and (c) iodine, the mol ratio of said organomagnesium compound to total titanium in said catalyst being in the range of 0.75:1 to 3:1, the mol ratio of $TiX_m$ compound to iodine being in the range of 0.5:1 to 1.25:1, said contacting occurring at a temperature in the range of −100 to 250° F. and at a pressure sufficient to maintain the reaction mixture in the liquid phase; and recovering a polybutadiene containing at least 90 percent of cis-1,4-addition.

2. A process according to claim 1 in which said catalyst is that which forms on mixing diphenylmagnesium, titanium tetrachloride and iodine.

3. A process according to claim 1 in which said catalyst is that which forms on mixing dibutylmagnesium, titanium tetrabromide and iodine.

References Cited by the Examiner

UNITED STATES PATENTS

| | | | |
|---|---|---|---|
| 2,938,019 | 5/60 | Stuart | 260—93.7 |
| 2,959,576 | 11/60 | Payne | 260—94.9 |
| 2,979,488 | 4/61 | Carpenter | 260—94.3 |
| 2,994,691 | 8/61 | Gates | 260—93.7 |
| 3,036,056 | 5/62 | Rion | 260—94.3 |
| 3,076,795 | 2/63 | Hall | 260—94.3 |

FOREIGN PATENTS 1,256,231  2/61  France.
(Corresponds to 904,421, Great Britain.)

JOSEPH L. SCHOFER, *Primary Examiner.*

MORRIS LIEBMAN, *Examiner.*